No. 748,635. PATENTED JAN. 5, 1904.
F. A. MUSCHENHEIM & W. F. HENDRY.
AUTOMATIC BRAKE FOR CONTROLLING SWITCHES OF ELECTRIC MOTORS.
APPLICATION FILED JUNE 2, 1902.
NO MODEL.
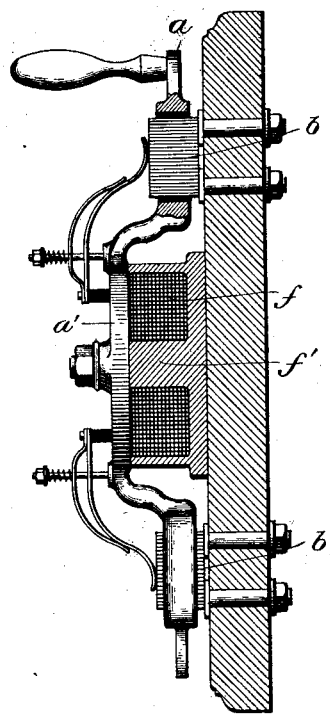
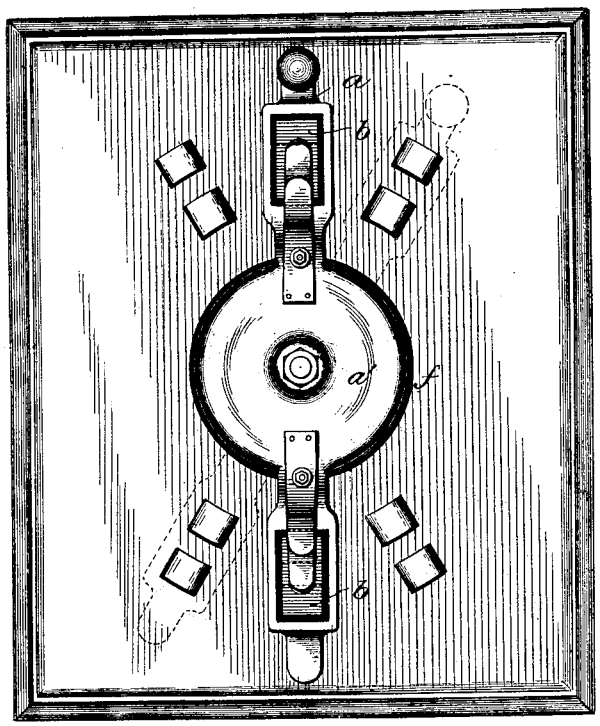
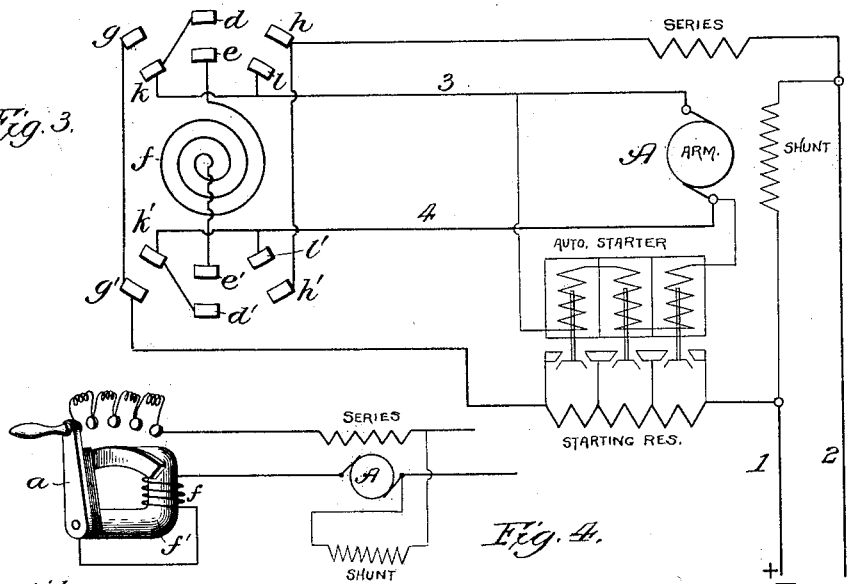
Witnesses:
Chas. E. Gaylord,
John Enders Jr.
Inventors:
Frederick A. Muschenheim, and
William F. Hendry,
By Henry P. Barton
Att'y No. 748,635. Patented January 5, 1904.

UNITED STATES PATENT OFFICE.

FREDERICK A. MUSCHENHEIM AND WILLIAM F. HENDRY, OF NEW YORK, N. Y., ASSIGNORS TO WESTERN ELECTRIC COMPANY, OF CHICAGO, ILLINOIS, A CORPORATION OF ILLINOIS.

AUTOMATIC BRAKE FOR CONTROLLING SWITCHES OF ELECTRIC MOTORS.

SPECIFICATION forming part of Letters Patent No. 748,635, dated January 5, 1904.

Application filed June 2, 1902. Serial No. 109,996. (No model.)

*To all whom it may concern:*

Be it known that we, FREDERICK A. MUSCHENHEIM and WILLIAM F. HENDRY, citizens of the United States, residing at New York, in the county of New York and State of New York, have invented a certain new and useful Improvement in Automatic Brakes for Controlling Switches of Electric Motors, (Cases Nos. 2 to 4,) of which the following is a full, clear, concise, and exact description.

Our invention relates to controlling mechanism for motor devices; and its object is to provide means for preventing the too rapid or premature operation of the controlling mechanism—for example, in the case of an electric motor to prevent the change of the controlling-switch to reverse the current in the armature while the latter is revolving at a high speed.

In accordance with our invention the controlling-lever is provided with a block or brake to arrest or retard its movement, and this brake is operatively connected with the motor controlled by said lever in the course of moving the lever from one running position to another, so that the further movement of the controlling-lever is prevented until the speed of the motor device is checked.

Our invention is particularly useful in connection with electric motors, since ordinary workmen are rarely competent to handle the controlling-switches and serious damage is frequently caused by the too rapid movement of the controlling-switch in starting or reversing the motor.

A controlling-switch constructed in accordance with our invention cannot be moved too rapidly, because the excessive current flows through the coil of the brake-magnet and holds the switch-lever against further movement.

The invention is particularly designed to be applied to reversing-switches, and in this case the coil of the magnetic brake would be connected in a local circuit with the armature of the motor by contacts closed by the switch-arm in changing from one running position to the other. When the motor is running in one direction and it is desired to reverse its movement, the operator swings the switch-lever to its central or "off" position, in which the main circuit is opened and the armature connected in a local circuit with the magnet-coil of the brake. The speed of the armature is quickly reduced by reason of the dynamic braking action due to the completion of the local circuit for the armature, and the current flowing in this circuit energizes the brake-magnet, so that the switch-lever is held in the off position until the armature has nearly or quite come to rest.

As applied to reversing-switches for electric motors our invention consists, briefly, in using the current generated by the momentum or inertia of the revolving armature to retard or arrest the further movement of the reversing-switch lever.

Our invention is also capable of application to starting-switches to prevent the too rapid cutting out of the starting resistance.

We will describe our invention more particularly by reference to the accompanying drawings, wherein—

Figure 1 is a vertical sectional view of a reversing-switch embodying our invention. Fig. 2 is a plan view thereof. Fig. 3 is a diagram illustrating the circuits connecting such a switch with the motor to be controlled thereby, and Fig. 4 is a diagram illustrating the application of our invention to a starting-switch.

The same parts are indicated by the same characters of reference wherever they are shown.

The switch shown in Figs. 1, 2, and 3 is provided with a centrally-pivoted rocking lever $a$, which carries at each end a carbon brush or contact-piece $b$, which is adapted to slide over and make connection with the several switch contact-pieces. When the switch-arm is at the right, as shown in dotted lines in Fig. 2, the motor will be connected with the main circuit so as to run in a given direction, and when the switch is moved to the left the current through the armature will be reversed, so that the motor will run in the opposite direction.

In Fig. 3 we have shown the circuits connecting the reversing-switch with a motor. The conductor 1 of the main circuit is led through the starting resistance to the contacts $g\ g'$ of the switch, and the conductor 2 is led through the series field-winding of the motor to the contacts $h$ and $h'$. The contacts $k$ and $l$ are connected by conductor 3 with one side of the armature, and contacts $k'$ $l'$ are similarly connected by a conductor 4 with the other pole of the armature. Contact-pieces $d$ and $k$ are connected together, and contact-pieces $d'$ $k'$ are also connected together. Contact-pieces $e$ and $e'$ are connected to the terminals, respectively, of the magnet-coil $f$. When the switch-arm is in its right-hand position, the contacts $h$ and $l$ are connected together by the upper carbon brush $b$, and the contacts $k'$ $g'$ are also connected by the lower carbon brush. In the alternative position the contacts $g$ and $k$ will be united by the upper carbon brush and the contacts $h'$ $l'$ by the lower brush. When the switch-arm is in its central or off position, the main circuit 1 is interrupted and the armature is connected in a local circuit 3 4 with the magnet-coil $f$.

The switch-lever $a$ is preferably enlarged into a disk form $a'$ at the center to form an armature for the brake-magnet $f$, which is of cup-shaped form with the armature pivoted to the central core $f'$. The annular space between the central core and the outer rim of the casting is occupied by the coil $f$, through which the armature A is short-circuited when the switch is in its central position. The current flowing through the coil $f$ energizes the magnet so that the disk portion of the switch-lever is drawn so tightly against the rim of the core that the switch-lever cannot be moved until the magnet is deënergized. When the motor is running in one direction and it is desired to reverse it, the switch is first thrown to the central position, whereupon the armature is short-circuited through the magnet $f$. This acts as a dynamic brake to quickly reduce the speed of the armature, and at the same time the current generated by the momentum of the armature is utilized to excite the magnetic brake and prevent the further movement of the reversing-lever until the armature has come to rest. As soon as the armature stops the switch-lever is automatically released and can then be thrown over to its alternative running position.

In Fig. 3 we have indicated diagrammatically an automatic starting device, which is well known in the art, for gradually cutting out the starting resistance as the motor comes up to speed. In Fig. 4 we have illustrated the application of our invention to the starting-switch, in which the resistance is cut out by hand. Here the coil of the braking-magnet for the switch is connected permanently in series with the armature. The brake-magnet is so wound that ordinarily it will not prevent the movement of the switch-lever; but if the switch-lever is moved too rapidly in cutting out the resistance, so that an excessive current flows in the circuit, the magnet will hold the switch-lever and prevent its further movement until the armature has come up to speed, whereupon the current will be sufficiently diminished so that the switch-arm may be moved to cut out more resistance, if desired.

It is evident that our invention is capable of application to motor devices other than electrical, since it is evident that any desired connection may be made between a motor and a brake or block for the controlling-lever thereof whereby the movement of the motor device is utilized to prevent the further movement of the controlling-lever.

We claim—

1. The combination with an electric motor and a controlling-switch therefor, of an electromagnetic brake for arresting the movement of the switch-lever, and a circuit including the magnet of the brake with the armature of the motor.

2. The combination with an electric motor, of a reversing-switch therefor, an electromagnetic brake for arresting the movement of the switch-arm, and a local circuit including the motor-armature and the brake-magnet, established in contacts closed by the switch-arm in changing from one running position to the other.

3. The combination with an electric motor, of a reversing-switch therefor, a magnet associated with the operating-lever of said reversing-switch, an armature moved across the pole-faces of the magnet by said operating-lever, said magnet being adapted when excited to prevent the movement of the operating-lever, a local circuit for said magnet, and switch-contacts, closed by the operating-lever in changing from one running position to the other, controlling said local circuit.

4. The combination with a cup-shaped magnet-core and a magnetizing-winding therefor, of a disk-shaped armature fitting over the core and centrally pivoted, a switch-arm extending from said armature and controlling the circuit-changing switch-contacts, the movement of the switch-arm being arrested by the attraction of the disk armature by the magnet-core when the magnet is excited, a motor, circuits thereof controlled by the aforesaid switch-contacts, and a circuit including the winding of the magnet in series with the armature of the motor, said magnet being adapted to prevent the movement of the switch.

5. The combination with a motor device and a reversing-controller therefor, of a brake for resisting the movement of the controller-lever from one running position to the other, and an operative connection between the motor device and said brake, whereby the premature movement of the controller-lever to reverse the motor device is prevented.

In witness whereof we hereunto subscribe our names this 24th day of May, A. D. 1902.

F. A. MUSCHENHEIM.
WILLIAM F. HENDRY

Witnesses:
F. G. HUBBARD,
J. W. BANCKER.